(12) United States Patent
Moore et al.

(10) Patent No.: US 6,782,536 B2
(45) Date of Patent: *Aug. 24, 2004

(54) SYSTEM AND METHOD FOR DISCOVERING HOST-BASED APPLICATION ASSETS FOR THE DEVELOPMENT OF BUSINESS-CENTRIC SOFTWARE COMPONENTS

(75) Inventors: Jeffrey Allen Moore, Mission Viejo, CA (US); Shelby Kiyee Seid, Los Angeles, CA (US); Joseph Peter Stefaniak, San Clemente, CA (US)

(73) Assignee: Unisys Corporation, Blue Bell, PA (US)

(*) Notice: Subject to any disclaimer, the term of this patent is extended or adjusted under 35 U.S.C. 154(b) by 0 days.

This patent is subject to a terminal disclaimer.

(21) Appl. No.: 09/328,126

(22) Filed: Jun. 8, 1999

(65) Prior Publication Data

US 2003/0195993 A1 Oct. 16, 2003

(51) Int. Cl.[7] ................................ G06F 9/00
(52) U.S. Cl. ........................ 719/310; 717/109
(58) Field of Search ................ 707/505; 717/109; 719/310

(56) References Cited

U.S. PATENT DOCUMENTS 5,974,430 A * 10/1999 Mutschler .................. 707/505
6,049,832 A * 4/2000 Brim et al. ................. 709/237
6,061,516 A * 5/2000 Yoshikawa et al. ......... 717/109
6,182,276 B1 * 1/2001 Brawn et al. ............... 717/109
6,223,180 B1 * 4/2001 Moore et al. ............... 707/100
6,253,244 B1 * 6/2001 Moore et al. ............... 709/231
6,405,037 B1 * 6/2002 Rossmann ................... 455/426

FOREIGN PATENT DOCUMENTS

WO    WO 98/21671    * 5/1998    ........... G06F/17/30

* cited by examiner

Primary Examiner—Meng-Al T. An
Assistant Examiner—Li B. Zhen
(74) Attorney, Agent, or Firm—Phuong-Quan Hoang; Mark T. Starr; Lise A. Rode (57) ABSTRACT

A method in a computer system is disclosed for discovering host-based legacy screen assets. The system has a client, a server and a host, including a repository. The method comprises the steps of creating an application object comprising a collection of the legacy screen assets; and, creating a recognition file for storing constituent elements of the legacy screen assets. After this, a first stream of data representative of the legacy screen asset is received from the host in response to a request by the client for data fields. Next, the first data stream is parsed into constituent elements and stored in the recognition file and then the constituent elements are associated with the screen assets. The constituent elements of the first data stream are appended to the recognition file for the screen assets; and, then they are associated with data names that are stored in the repository, thereby creating a specification for each of said legacy screen assets.

10 Claims, 5 Drawing Sheets

SYSTEM AND METHOD FOR DISCOVERING HOST-BASED APPLICATION ASSETS FOR THE DEVELOPMENT OF BUSINESS-CENTRIC SOFTWARE COMPONENTS

CROSS REFERENCE TO RELATED APPLICATIONS

This application relates to the following co-pending application, assigned to the same assignee hereof, the texts of which is incorporated herein by reference.

U.S. Ser. No. 09/328,125, entitled IN AN OBJECT-ORIENTED REPOSITORY, A SYSTEM AND METHOD FOR RE-USING EXISTING HOST-BASED APPLICATION ASSETS FOR THE DEVELOPMENT OF BUSINESS-CENTRIC APPLICATIONS. filed on Jun. 8, 1999, now U.S. Pat. No. 6,349,404, issued on Feb. 19, 2002.

A portion of the disclosure of this patent document contains material that is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The present invention generally relates to the field of computer systems for developing business applications; and, in particular, it relates to a system and computer-implemented method for providing access to host-based screen applications for the development of business-centric software components.

BACKGROUND OF THE INVENTION

The software industry has seen great advances in distributed computing from both a client/server and software modeling perspective. The move towards network-centric computing, using the client/server architecture of the Internet, coupled with new software tools and component-based models, equip today's software developer with a distributed, object-oriented, infrastructure that affords ease of access and manipulation of business data.

In the early nineties, as client-server computing emerged; more advanced software solutions introduced more intelligent links among clients and servers. Although it represents an improvement over earlier models, client-server computing still suffers from a number of drawbacks. For example, since information carried between clients and servers is usually transmitted over a proprietary protocol, each user tends to implement a closed solution, i.e., a solution that works only for the product of that user.

Earlier disclosed methods and systems for performing similar functions to that of the present invention are set forth in one or more of the following: U.S. Pat. No. 5,815,149, entitled METHOD FOR GENERATING CODE FOR MODIFYING EVENT ROUTINES FOR CONTROLS ON A FORM; U.S. Pat. No. 5,974,430, entitled A METHOD FOR DYNAMICALLY EMBEDDING OBJECTS STORED IN A WEB SERVER WITHIN HTML FOR DISPLAY BY A BROWSER; U.S. Pat. No. 6,157,936, entitled METHOD FOR EXTENDING THE HYPERTEXT MARKUP LANGUAGE (HTML) TO SUPPORT A GRAPHICAL USER INTERFACE CONTROL PRESENTATION; U.S. Pat. No. 6,223,180, entitled A SYSTEM AND COMPUTER IMPLEMENTED METHOD FOR TRANSFORMING HOST-BASED SCREEN APPLICATIONS INTO COMPONENTS USEFUL IN DEVELOPING INTEGRATED BUSINESS-CENTRIC APPLICATIONS; and, U.S. Pat. No. 6,253,244, entitled A SYSTEM AND COMPUTER IMPLEMENTED METHOD FOR PROVIDING ACCESS TO HOST-BASED SCREEN APPLICATIONS USING BUSINESS-CENTRIC SOFTWARE COMPONENTS, all of which are assigned to the assignee hereof.

In the current scenario, distributed component-based development and enabling solutions are changing the way information is discovered, built, managed and delivered. Organizations are investing in component-based technologies because they cannot afford to ignore the reductions in costs that the new technology offers. As a method for delivering information to large numbers of end-users, the iterative process of building and deploying components are appealing when compared with the alternative of configuring every end-user system with application-specific client applications.

A reduction in the overall costs is just one benefit. Other benefits include access to larger amounts of enterprise information for connecting the organization, delivering solutions and keeping pace with end-user demands, and being able to take advantage of ever changing technology more effectively. Effective business processes require information, and the objective for the Information System (IS) organizations is to ensure that the required information is available when it is needed.

An example of a prior art method is disclosed in U.S. Pat. No. 5,815,149, entitled METHOD FOR GENERATING CODE FOR MODIFYING EXISTING EVENT ROUTINES FOR CONTROLS ON A FORM, by Eugene Mutschler, et al, and assigned to the assignee hereof. This patent teaches a method for converting existing forms of legacy programs into a more modern and widely-used format. The present invention on the other hand, discloses and claims an improvement over what is taught in this patent by rendering those legacy forms into object oriented data format for use in any distributed object oriented business process development framework.

The present invention re-uses existing business assets in new component-based paradigms. It employs a method that enhances the efficiency of the current technology and reduces its drawbacks.

SUMMARY OF THE INVENTION

In accordance with the present invention a system is provided that reduces overall costs while efficiently accessing large amounts of enterprise information for connecting the organization, delivering solutions and keeping pace with end-user demands for ever-changing technology.

An advantage of the present invention is the use of component-based technology, which embraces the entire realm of an organization's information infrastructure. Component-based technologies can take advantage of differing client platforms, diverse application environments and connectivity options.

An object of the present invention is to provide a system where organizations may re-use legacy screen-based application assets in component-based frameworks.

Another object of the present invention is to provide a system that can discover legacy screen-based assets of an organization.

Yet another object of the present invention is to provide a system that stores the legacy screen-based assets of an organization as specifications that can be used to generate components irrespective of the underlying middleware implementation.

Still another object of the present invention is to provide a method and system that permits an organization to associate a legacy-based screen specification to a component-based implementation, which would otherwise not be possible.

Another object of the present invention is to provide a system that permits an organization to achieve levels of information enabling, through model-based development, which would otherwise not be possible.

Still other objects, features and advantages of the present invention will become readily apparent to those skilled in the art from the following detailed description, wherein is shown and described only the preferred embodiment of the invention, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive, and what is intended to be protected by Letters Patent is set forth in the appended claims. The present invention will become apparent when taken in conjunction with the following description and attached drawings, wherein like characters indicate like parts, and which drawings form a part of this application.

DETAILED DESCRIPTION OF ONE EMBODIMENT

Before proceeding with a description of the system and method of the present invention, a summary of terminology used herein is provided, which may be helpful in understanding the disclosed embodiment.

An object is an abstract representation of a real-world concept or thing. For example, an object can be used to represent a customer account in a banking application. An object has features, which can be either an operation or a property. An operation defines an action that an object can perform, or an action that can be performed on the object. For example, "make withdrawal" could be defined as an operation on a customer account object. Properties indicate the state of an object. Every property of an object has a value, and it is the property values that define the state of the object. A property can be either an attribute or a reference. An attribute defines a value that is stored within the object. For example, "current account balance" could be an attribute of the customer account object. The numeric value for the customer's account balance would be stored in the customer account object. A reference is a link or pointer to another object, and implies a relationship to that other object. A reference is typically used when it is desired not to duplicate data. For example, the customer account object could store the customer's name and address as attributes. However, if the customer opened multiple accounts, the customer's name and address would appear in multiple account objects. Therefore, it is desirable to define a separate customer object and place the name and address as attributes of the customer object. The customer account object would then contain a reference to the customer object.

A normal object program stores objects in a computer system's memory. When the program terminates, the memory used by those objects is freed and reused by other programs, making the objects that the program stored transient. An object database stores objects in a non-volatile memory, such as a computer disk. Since the information on a computer disk remains in existence, even when the computer is turned off, an object database provides the ability to persistently store objects. An object program that uses an object database thus has the option of storing objects transiently or persistently.

The term protocol as used herein refers to a set of formal rules describing how to transmit data, especially across a network. Low-level protocols define the electrical and physical standards to be observed, bit- and byte-ordering and the transmission and error detection as well as correction of the bit stream. High-level protocols deal with message formatting, including the syntax of messages, the terminal to computer dialogue, character sets, sequencing of messages, etc.

Modeling the world as objects and then implementing them in an object-oriented system is the basis of object-oriented technology. Corporations are just beginning to apply the concepts of object technology to the business itself. Anything that is related to the finances, products, or customers of an enterprise can be a business object and work as part of a cooperative business object system. Business objects represent things, processes or events that are meaningful to the conduct of a business. Business objects make sense to business people. More specifically, a business object is a representation of an active thing in the business domain, including at least its business name and definition, attributes, behavior, relationships, rules, policies and constraints. Typical examples of business objects are an employee, a product, an invoice or payment receipt. Business objects do not have to be written in an object-oriented language.

An object represents the business object abstraction, which models the real world in the information system. Each such object in the information model is a component of that information model and must be supported by a technology infrastructure. The discovery phase is characterized by the capturing of source information. A unit of source information is characterized as containing enough information to allow it to be effectively modeled. Source information can include the screen input and output of legacy transactions, documents, data base records, etc.

Figure 1:
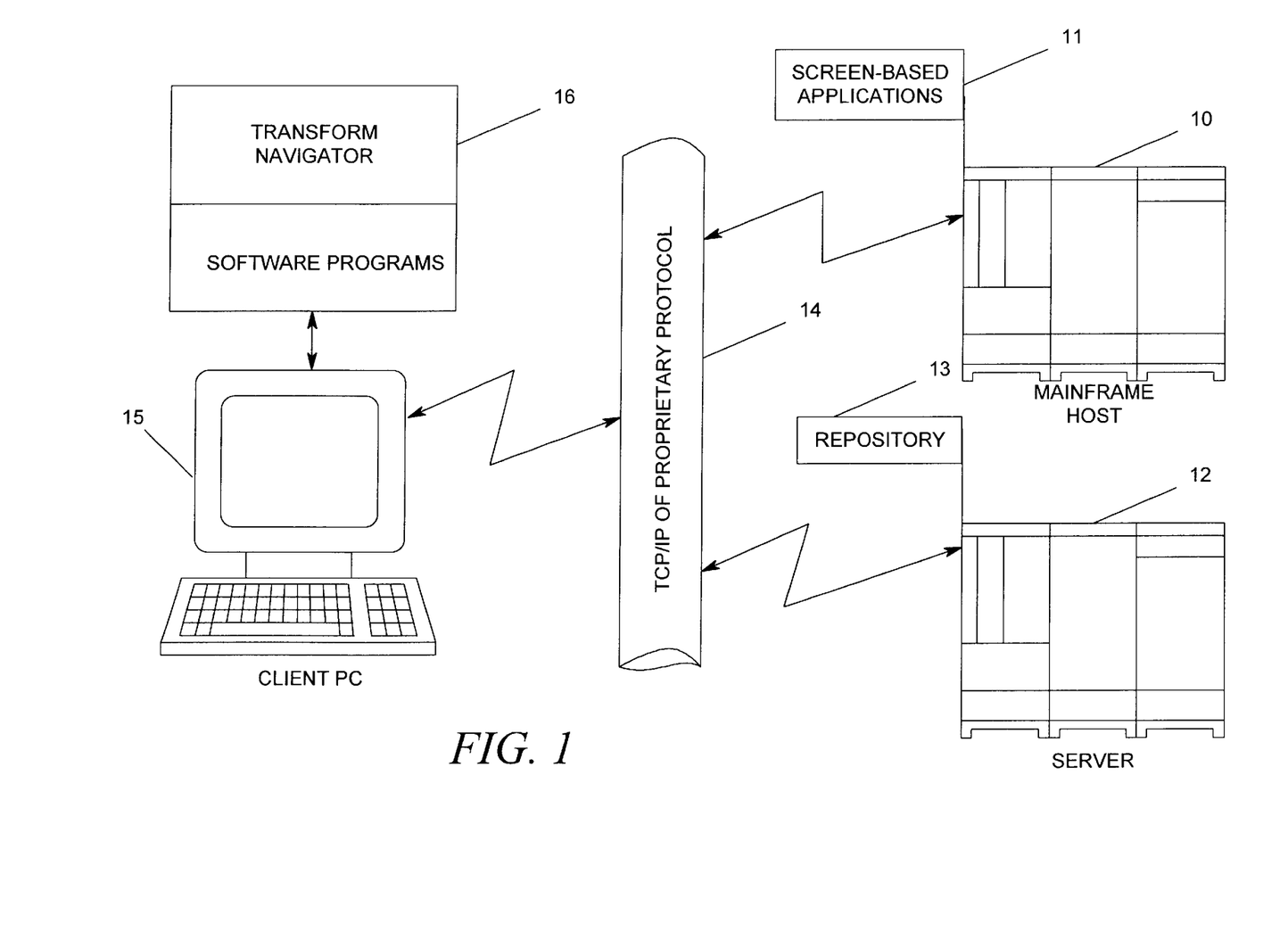
FIG. 1 is a block diagram of a computer system framework which may employ the method and system of the present invention.

Referring now to FIG. 1, a system configuration is illustrated, including a mainframe host 10 executing many computer programs, including screen-based applications 11. Also, a server 12 executes many programs, including a repository program 13. The mainframe 10 and the server 12 are coupled to a TCP/IP or DCOM 14, which in turn is coupled to a multiplicity of clients, such as a client PC 15. The PC 15 is capable of executing software programs 16 including a transform navigator.

In the disclosed embodiment, the repository program 13 is a specialized, extensible object-oriented database application that adds value to a database system, which allows customization of a particular domain (such as application development).

The repository program 13 further includes methods for cataloging, browsing, modeling, and managing components that make up an application. Methods to support these services are disclosed in several patents and patent applications assigned to the assignee of this patent application, including U.S. Pat. No. 5,671,398 for METHOD FOR COLLAPSING A VERSION TREE WHICH DEPICTS A HISTORY OF SYSTEM DATA AND PROCESSES FOR AN ENTERPRISE; U.S. Pat. No. 5,644,764 for METHOD FOR SUPPORTING OBJECT MODELING IN A REPOSITORY; U.S. Pat. No. 5,581,755 for METHOD FOR MAINTAINING A HISTORY OF SYSTEM DATA AND PROCESSES FOR AN ENTERPRISE; U.S. Pat. No. 5,557,793 for IN AN OBJECT ORIENTED REPOSITORY, A METHOD FOR TREATING A GROUP OF OBJECTS AS A SINGLE OBJECT DURING EXECUTION OF AN OPERATION; U.S. Pat. No. 5,889,992 for A METHOD FOR MAPPING TYPES IN A MODEL IN A OBJECT-ORIENTED REPOSITORY TO LANGUAGE CONSTRUCTS FOR A C BINDING FOR THE REPOSITORY; U.S. Pat. No. 5,721,925, for METHOD FOR GENERICALLY INVOKING OPERATIONS IN AN OBJECT ORIENTED REPOSITORY; U.S. Pat. No. 5,848,273 for A METHOD FOR GENERATING OLE AUTOMATION AND IDL INTERFACES FROM METADATA INFORMATION; U.S. Pat. No. 5,765,039 for A METHOD FOR PROVIDING OBJECT DATABASE INDEPENDENCE IN A PROGRAM WRITTEN USING THE C++ PROGRAMMING LANGUAGE; U.S. Pat. No. 5,758,348, for A METHOD FOR GENERICALLY MANIPULATING PROPERTIES OF OBJECTS IN AN OBJECT ORIENTED REPOSITORY; U.S. Pat. No. 5,701,472, for A METHOD FOR LOCATING A VERSIONED OBJECT WITHIN A VERSION TREE DEPICTING A HISTORY OF SYSTEM DATA AND PROCESSES FOR AN ENTERPRISE; U.S. Pat. No. 6,105,073, filed on May 30, 1996, for A METHOD FOR PACKING/UNPACKING C OPERATIONS TO/FROM RPC COMPATIBLE FORMAT USING THE RPC PROTOCOL TO OPERATE REMOTELY WITH AN OBJECT-ORIENTED REPOSITORY; U.S. Pat. No. 6,018, 627, filed on Sep. 22, 1997, for TOOL-INDEPENDENT APPLICATION DEVELOPMENT; and, U.S. Pat. No. 6,038,393, filed on Sep. 22, 1997, for EXCHANGING INFORMATION BETWEEN DIFFERENT OBJECT MODELS AND UML; each of which are hereby incorporated by reference as if set forth in full herein.

Figure 2:
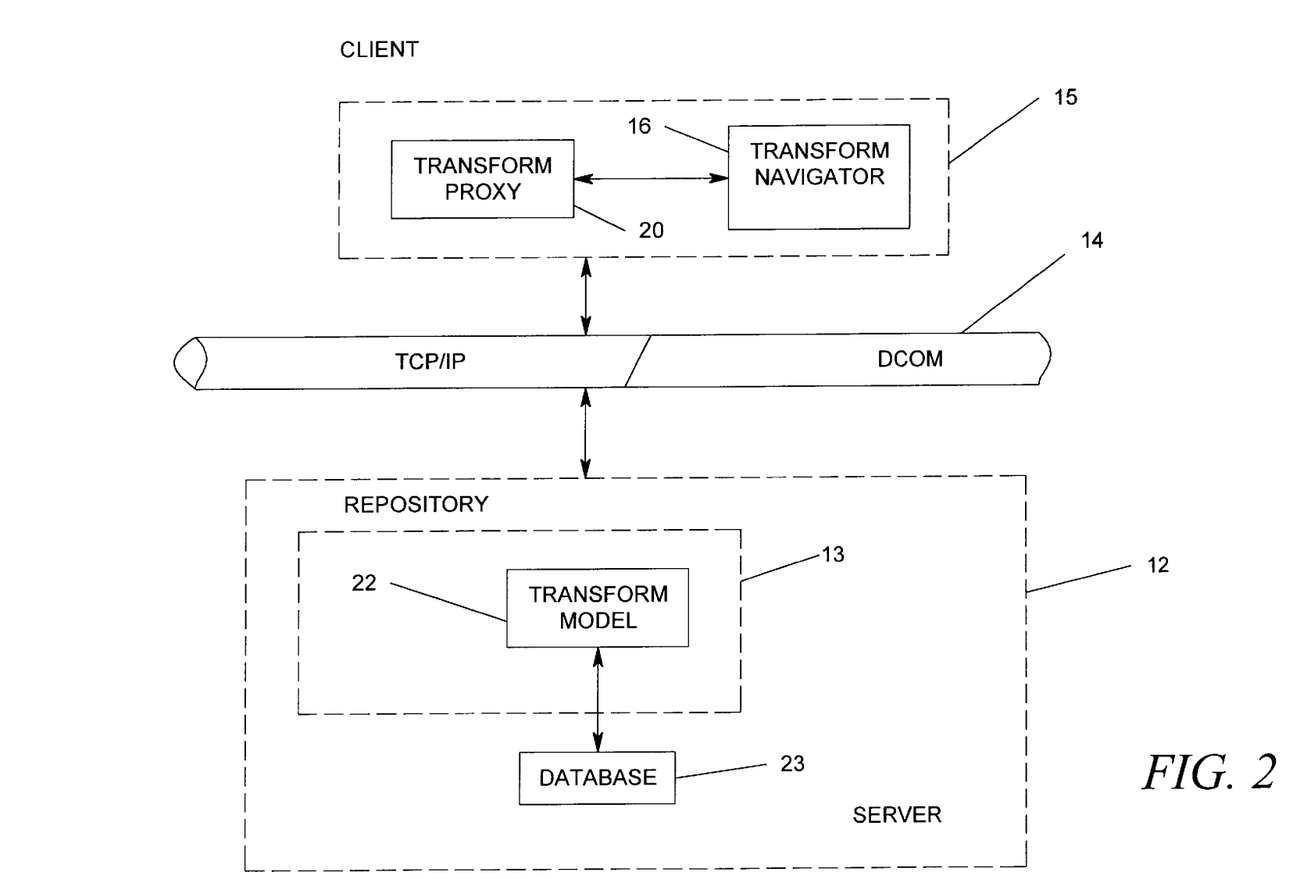
FIG. 2 is a software module block diagram of the method and system of a theoretical model of the present invention.

Referring now to FIG. 2, a block diagram of a software module block diagram of the method and system of a theoretical model of the present invention is shown. Various modules used for building and transforming screens on a host application into software components useful in developing business-centric applications are illustrated. Within the PC 15 is a transform proxy 20, which is a COM compliant component that provides the capability to access the transform navigator 16. The transform proxy 20 communicates directly with the TCP/IP or DCOM 14, which in turn communicates directly with a transform model 22 within the repository program 13 being executed by the server 12.

A database 23 is accessible by the repository 13 for the storage and retrieval of host-based legacy data specifications. A typical database satisfactory for the database 23 is OSMOS, which is an object-oriented/relational database available from the assignee hereof.

Figure 3:
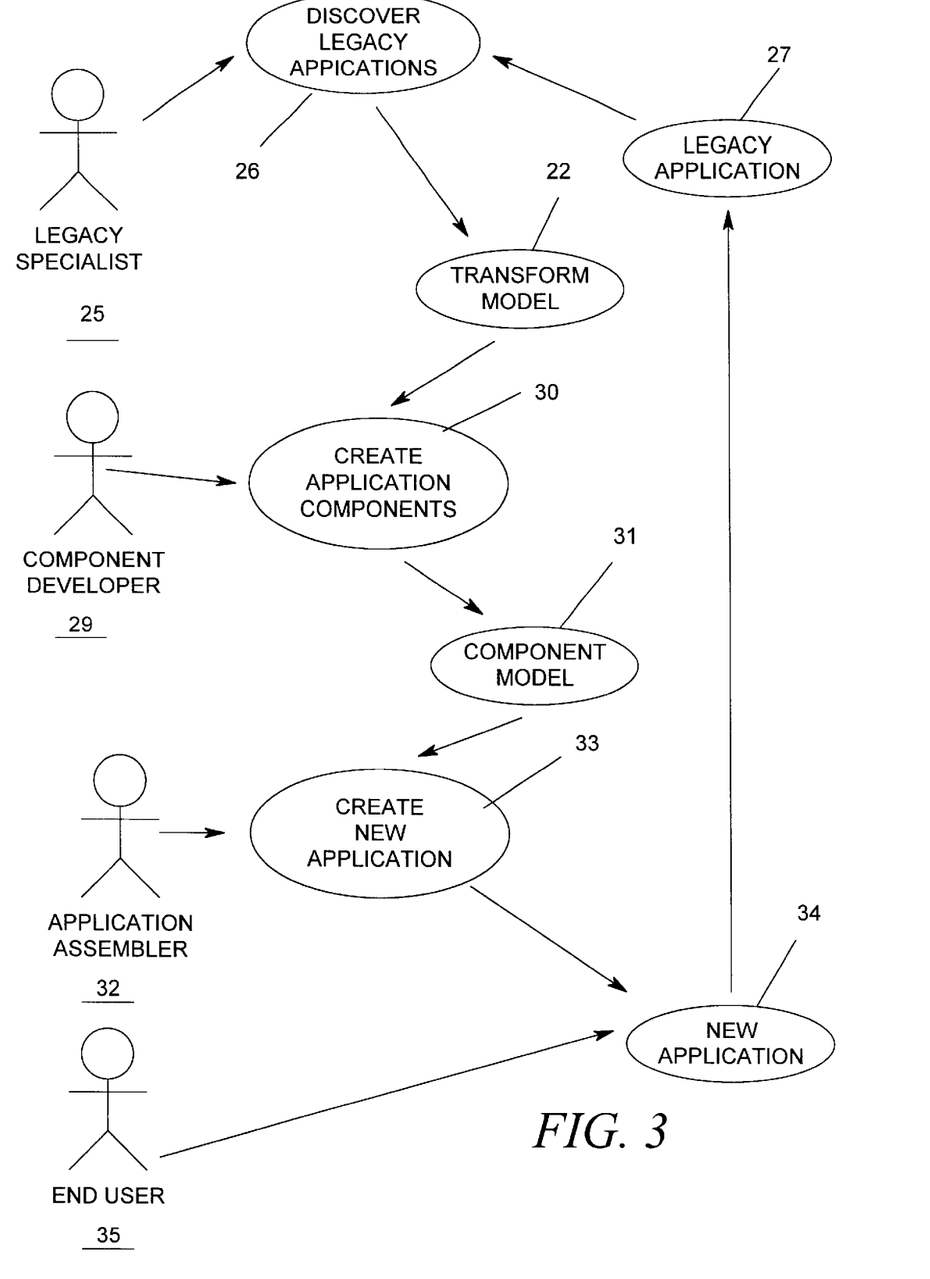
FIG. 3 is a use case diagram of the present invention.

Referring now to FIG. 3, a use case diagram of the present invention is shown. The first act to be performed is by a legacy specialist 25, who discovers 26 a legacy application 27 by use of the present invention. The result of the discovery operation 26 produces the transform model 22 in accordance with the present invention. A component developer 29 uses the transform model 22 to create application components 30, which in turn are used to generate a component model 31.

An application assembler 32 uses the component model 31 to create 33 a new application 34. The new application 34 is run in parallel with the legacy application 27 by an end user 35. Accordingly, the legacy application 27 may be re-used in a component-based, NT-centric framework, such as the new application 34. As will be shown in greater detail hereinbelow, a method and system is provided that includes an iterative process for building and deploying components as illustrated in FIG. 3. Such a method and system allows the delivery of information to large numbers of end-users without configuring every end-user system with application-specific client applications.

Figure 4A:
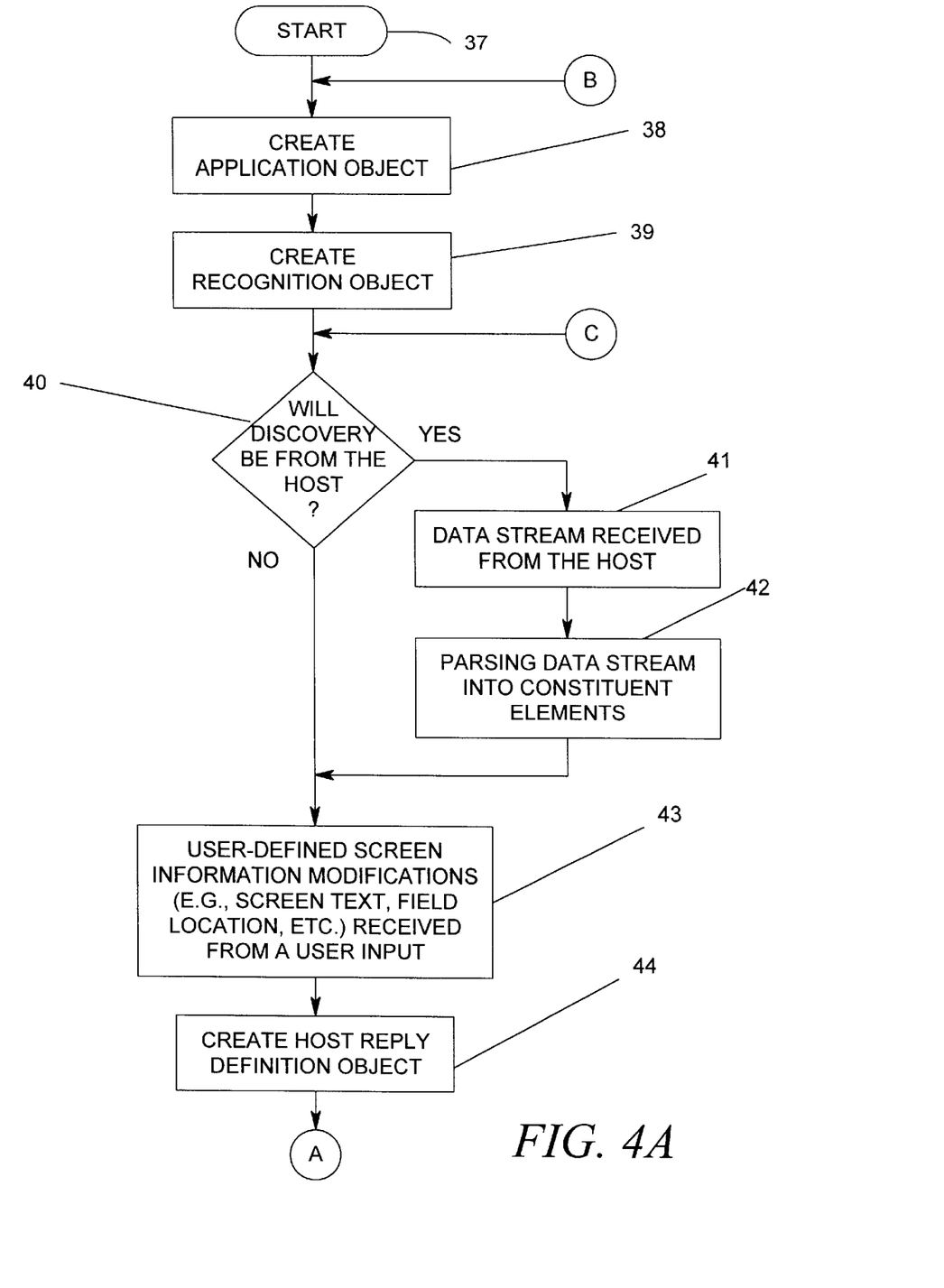
FIGS. 4A and 4B combined form an overall flow chart of the method of the present invention.
Figure 4B:
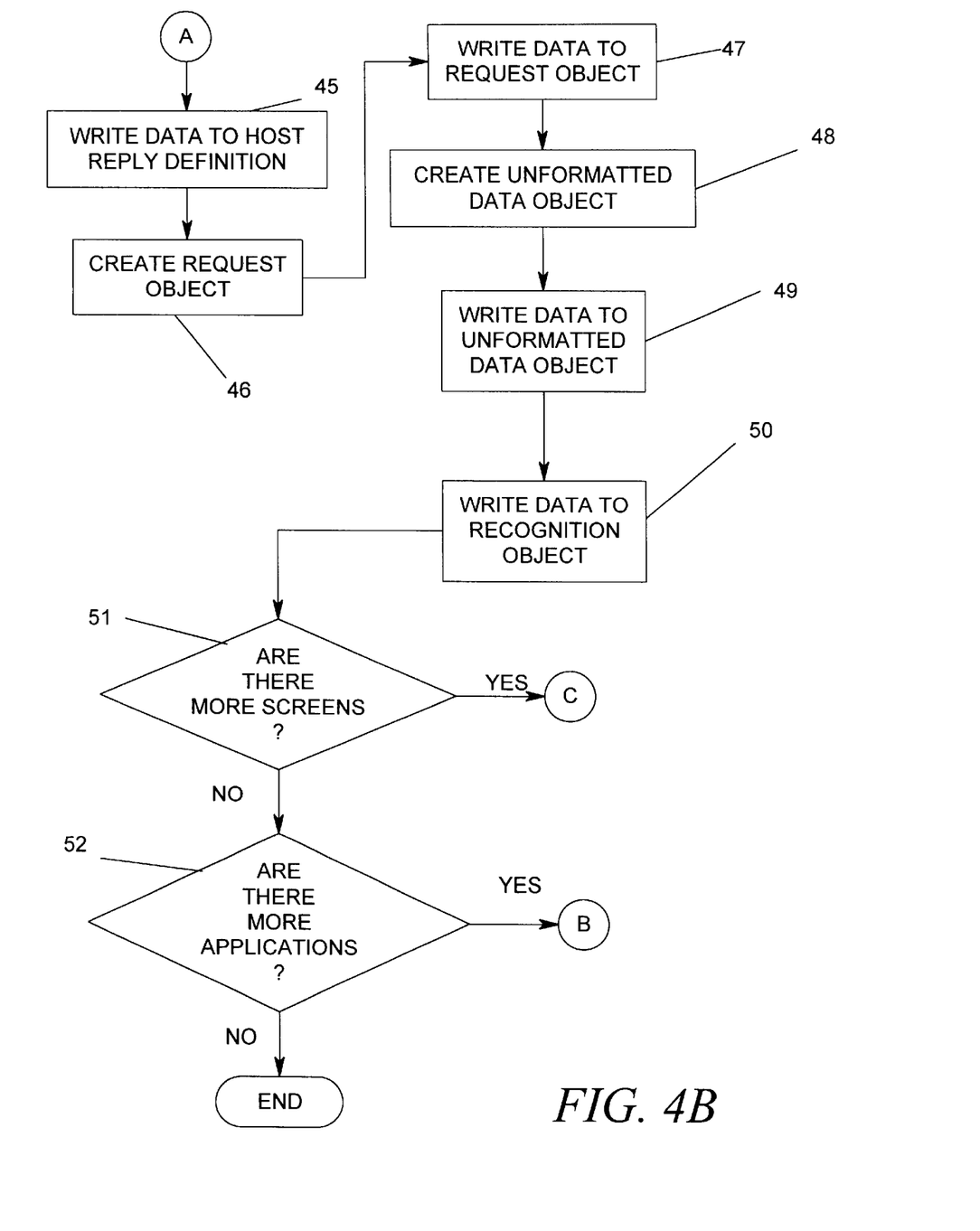

Referring now to FIGS. 4A and 4B, a flow chart of the method of the present invention is shown. The process begins with a start bubble 37 followed by a step of creating an application object (block 38). The Application class of objects includes attributes that specify the set of Users that have access to this Application; the set of Common Files that belong to this Application and a sat of objects that provide a host connection for this Application. Next, a recognition object is created (block 39) for storage of application level data. Next, an inquiry is made as to whether or not discovery of the legacy application will be (mm the host (diamond 40). If the answer to this inquiry is yes, then a data stream representative of a legacy screen asset is received from the host (block 41) and then parsed into its constituent elements (block 42).

On the other hand, if the answer to this inquiry is no, or upon completion of the step depicted by the block 42, user-defined screen information (e.g., screen text, field location, etc.) is received (block 43).

After completion of the above, a host reply definition object is created (block 44), which represents the host reply definitions (HRD) file that includes an attribute specifying the Form that uses this HRD file. The process illustration continues in FIG. 4B as denoted by a connector A.

Referring now to FIG. 4B at the connector A, data is written to the host reply definition object (block 45) and a request object is created (block 46). A request class of objects stores a request file and includes an attribute that specifies the Form using the request file. Request data is next written to the request object (block 47) and an unformatted data object is created (block 48). The unformatted data class of objects is a general purpose file for storing data of any kind. It includes an attribute that specifies the set of Forms that use this file.

Next, screen application data is written to the unformatted data object (block 49) and application level data is written to the recognition data object (block 50). Following the above, an inquiry is made as to whether or not there are more screens (diamond 51). If the answer to this inquiry is yes, then a return is made back to the block 41 (FIG. 4A) as denoted by a connector C. On the other hand, if the answer to this inquiry is no, then another inquiry is made as to whether or not there are more applications (diamond 52). If the answer to this second inquiry is yes, then a return is made back to the block 43 (FIG. 4A) as denoted by a connector B. On the other hand, if the answer to this inquiry is no, then the process ends.

The methods and apparatus of the present invention, or certain aspects or portions thereof, may take the form of program code (i.e., instructions) embodied in tangible media, such as floppy diskettes, CD-ROMS, hard drives, or any other machine-readable storage medium, wherein, when the program code is loaded into and executed by a machine, such as a computer, the machine becomes an apparatus for practicing the invention. The methods and apparatus of the present invention may also be embodied in the form of program code that is transmitted over some transmission medium, such as over electrical wiring or cabling, through fiber optics, or via any other form of transmission, wherein, when the program code is received and loaded into and executed by a machine, such as a computer, the machine becomes an apparatus for practicing the invention. When implemented on a general-purpose processor, the program code combines with the processor to provide a unique apparatus that operates analogously to specific logic circuits.

Although the invention has been described with reference to a specific embodiment, this description is not meant to be construed in a limiting sense. Various modifications of the disclosed embodiment as well as alternative embodiments of the invention will become apparent to one skilled in the art upon reference to the description of the invention. It is therefore contemplated that the appended claims will cover any such modifications of embodiments that fall within the true scope of the invention.

What is claimed is:

1. A method for discovering legacy screens for use in a computer system including a client, a server and a host, the method comprising the steps of:
   a. creating a recognition object for storing respective application level data of the legacy screens;
   b. receiving a first data stream representative of a first of the legacy screens from the host in response to a request by the client for data fields;
   c. parsing the first data stream into constituent elements of the first legacy screen;
   d. appending a first subset of the constituent elements of the first legacy screen to the recognition object, the first subset of the constituent elements corresponding to the application level data of the first legacy screen; and
   e. associating the constituent elements of the first legacy screen with corresponding data names that are accessible by the server, so that a specification for the first legacy screen is created.

2. The method of claim 1 wherein step (e) comprises the steps of:
   f. creating a host reply object for the first legacy screen, the host reply object associating a second subset of the constituent elements of the first legacy screen with corresponding data names, the data names being associated with data values included in the first data stream received from the host; and
   g. creating a request object for the first legacy screen, the request object associating a third subset of the constituent elements of the first legacy screen with corresponding data names and associating the corresponding data names with data values to create a second data stream to be transmitted to the host.

3. The method of claim 1 further comprising the steps of:
   f. appending to the recognition object a respective subset of constituent elements of each of the legacy screens; and
   g. storing the recognition object for the legacy screens in a repository accessible by the server.

4. The method of claim 3 further including the step of associating the constituent elements of each of the legacy screens with data names stored in the repository.

5. A method for discovering legacy screens for use in a computer system including a client, a server and a host, the method comprising the steps of:
   a. creating a recognition object;
   b. receiving a data stream representative of one of the legacy screens from the host in response to a request by the client for screen text and data fields;
   c. parsing the data stream into constituent elements of the legacy screen;
   d. appending a first subset of the constituent elements in the recognition object;
   e. creating a host reply object for the legacy screen, the host reply object associating a second subset of the constituent elements with corresponding data names;
   f. creating a request object for the legacy screen, the request object associating a third subset of the constituent elements with corresponding data names; and
   g. repeating steps (b) through (f) above for each of the legacy screens, so that a specification for each of the legacy screens is created.

6. A program storage device readable by a machine, tangibly embodying a program of instructions executable by the machine to perform method steps for discovering host-based legacy screens, the machine including a computer system having a client, a server and a host, the method comprising the steps of:
   a. creating a recognition object for storing application level data of the legacy screens;
   b. receiving a first data stream representative of a first of the legacy screens from the host in response to a request by the client for data fields;
   c. parsing the first data stream into constituent elements of the first legacy screen;
   d. appending a first subset of the constituent elements of first legacy screen to the recognition object, the first subset of the constituent elements corresponding to the application level data of the first legacy screen; and
   e. associating the constituent elements of the first legacy screen with data names that are accessible by the server.

7. The program storage device of claim 6 wherein step (e) comprises the steps of:
   f. creating a host reply object for the first legacy screen, the host reply object associating a second subset of the constituent elements of the first legacy screen with corresponding data names, the data names being associated with data values included in the first data stream received from the host; and
   g. creating a request object for the first legacy screen, the request object associating a third subset of the constituent elements of the first legacy screen with corresponding data names and associating the corresponding data names with data values to create a second data stream to be transmitted to the host.

8. The program storage device of claim 6 wherein the method further comprises the steps of:
   f. appending to the recognition object a respective subset of constituent elements of each of the legacy screens; and,
   g. storing the recognition object for the legacy screens in a repository accessible by the server.

9. The program storage device of claim 8 wherein the method further comprises the step of associating the constituent elements of each of the legacy screens with data names stored in the repository, so that a specification for each of the legacy screens is created.

10. A program storage device readable by a machine, tangibly embodying a program of instructions executable by the machine to perform method steps for discovering host-based legacy screens, the machine including a computer system having a client, a server and a host, the method comprising the steps of:

a. creating a recognition object;

b. receiving a data stream representative of one of the legacy screens from the host in response to a request by the client for screen text and data fields;

c. parsing the data stream into constituent elements of the legacy screen;

d. appending a first subset of the constituent elements in the recognition object;

e. creating a host reply object for the legacy screen, the host reply object associating a second subset of the constituent elements with corresponding data names;

f. creating a request object for the legacy screen, the request object associating a third subset of the constituent elements with corresponding data names; and g. repeating steps (b) through (f) above for each of the legacy screens, so that a specification for each of the legacy screens is created.

* * * * *